US009108390B2

(12) United States Patent
Borchardt

(10) Patent No.: US 9,108,390 B2
(45) Date of Patent: Aug. 18, 2015

(54) INCREMENTALLY-STRETCHED THERMOPLASTIC FILMS AND BAGS WITH INCREASED HAZE

(75) Inventor: Michael G. Borchardt, Naperville, IL (US)

(73) Assignee: The Glad Products Company, Oakland, CA (US)

( * ) Notice: Subject to any disclaimer, the term of this patent is extended or adjusted under 35 U.S.C. 154(b) by 166 days.

(21) Appl. No.: 13/289,829

(22) Filed: Nov. 4, 2011

(65) Prior Publication Data

US 2013/0115396 A1 May 9, 2013

(51) Int. Cl.
*B29C 65/00* (2006.01)
*B32B 27/08* (2006.01)
*B32B 3/30* (2006.01)

(52) U.S. Cl.
CPC . *B32B 27/08* (2013.01); *B32B 3/30* (2013.01); *B32B 2439/06* (2013.01); *Y10T 156/1007* (2015.01); *Y10T 428/1345* (2015.01); *Y10T 428/2457* (2015.01)

(58) Field of Classification Search
CPC ...... B32B 2439/06; B32B 27/08; B32B 3/30; B32B 27/32; B29C 55/18
USPC ........................................................ 428/35.5
See application file for complete search history.

(56) References Cited

U.S. PATENT DOCUMENTS 2,714,571 A 8/1955 Irion et al.
3,058,868 A 10/1962 Schroeder
3,622,422 A 11/1971 Newman et al.
3,857,144 A 12/1974 Bustin
4,116,892 A 9/1978 Schwarz
4,153,664 A 5/1979 Sabee
4,153,751 A 5/1979 Schwarz
4,289,832 A 9/1981 Schwarz
4,302,495 A 11/1981 Marra
4,343,848 A 8/1982 Leonard, Jr.
4,379,197 A 4/1983 Cipriani
4,438,167 A 3/1984 Schwarz
4,517,714 A 5/1985 Sneed et al.
4,522,203 A 6/1985 Mays
4,614,679 A 9/1986 Farrington, Jr. et al.
4,692,368 A 9/1987 Taylor et al.
4,704,238 A 11/1987 Okuyama et al.
4,753,840 A 6/1988 Van Gompel (Continued)

FOREIGN PATENT DOCUMENTS

WO WO9013702 11/1990
WO WO9956953 11/1999

OTHER PUBLICATIONS

ASTM D1003; pp. 1-7; Retrieved Sep. 26, 2014.*

(Continued)

*Primary Examiner* — James Yager
(74) *Attorney, Agent, or Firm* — Thomas C. Feix

(57) ABSTRACT

Methods of increasing the haze of a thermoplastic film include incrementally stretching thermoplastic films in the machine direction. In one or more implementations, methods of incrementally stretching thermoplastic films include reducing the gauge of the films without reducing the films' haze. The methods can involve cold stretching the films and imparting rib patterns into the film. The linear ribs can have alternating thick and thin gauges. Incrementally stretched thermoplastic films can have a haze that is approximately equal to or greater than the haze of the film prior to stretching.

26 Claims, 13 Drawing Sheets

(56) References Cited

U.S. PATENT DOCUMENTS

| | | | |
|---|---|---|---|
| 4,814,135 A | 3/1989 | Heitz | |
| 4,857,600 A | 8/1989 | Gross et al. | |
| 4,930,905 A | 6/1990 | Sharps, Jr. | |
| 5,035,941 A | 7/1991 | Blackburn | |
| 5,076,988 A | 12/1991 | Riffi | |
| 5,100,721 A | 3/1992 | Akao | |
| 5,153,382 A | 10/1992 | Gross et al. | |
| 5,296,184 A | 3/1994 | Wu et al. | |
| 5,382,461 A | 1/1995 | Wu | |
| 5,422,172 A | 6/1995 | Wu | |
| 5,518,801 A | 5/1996 | Chappell et al. | |
| 5,851,937 A | 12/1998 | Wu et al. | |
| 5,861,074 A | 1/1999 | Wu | |
| 5,865,926 A | 2/1999 | Wu et al. | |
| 6,013,151 A | 1/2000 | Wu et al. | |
| 6,139,185 A | 10/2000 | Hamilton et al. | |
| 6,150,647 A | 11/2000 | Anderson et al. | |
| 6,214,147 B1 | 4/2001 | Mortellite et al. | |
| 6,254,736 B1 | 7/2001 | Earl et al. | |
| 6,265,045 B1 | 7/2001 | Mushaben | |
| 6,361,784 B1 | 3/2002 | Brennan et al. | |
| 6,385,818 B1 | 5/2002 | Savicki, Sr. | |
| 6,394,651 B2 | 5/2002 | Jackson | |
| 6,394,652 B2 | 5/2002 | Meyer et al. | |
| 6,513,975 B1 | 2/2003 | Jackson et al. | |
| 6,695,476 B2 | 2/2004 | Jackson et al. | |
| 7,306,729 B2 | 12/2007 | Bacino et al. | |
| 2002/0074691 A1 | 6/2002 | Mortellite et al. | |
| 2004/0134923 A1 | 7/2004 | Aquino et al. | |
| 2006/0093766 A1 | 5/2006 | Savicki et al. | |
| 2006/0159576 A1* | 7/2006 | Bergman et al. | 417/572 |
| 2007/0166503 A1 | 7/2007 | Hannigan | |
| 2007/0254176 A1 | 11/2007 | Patel et al. | |
| 2008/0124461 A1 | 5/2008 | Leener et al. | |
| 2009/0029114 A1 | 1/2009 | Cancio et al. | |
| 2009/0211696 A1 | 8/2009 | Moe et al. | |
| 2010/0040875 A1* | 2/2010 | Patel et al. | 428/338 |
| 2011/0052104 A1 | 3/2011 | Wilcoxen et al. | |
| 2011/0117307 A1 | 5/2011 | Fraser et al. | |
| 2012/0033900 A1* | 2/2012 | Fraser et al. | 383/105 |
| 2012/0039550 A1* | 2/2012 | MacPherson et al. | 383/109 |

OTHER PUBLICATIONS

Wang et al., Light Transmission and Haze of Polyethylene Blown Thin Films, Polymer Engineering and Science, Feb. 1, 2001.

International Search Report, mailed Jan. 4, 2013, from counterpart PCT/US12/63081, filed Nov. 1, 2012.

* cited by examiner

INCREMENTALLY-STRETCHED THERMOPLASTIC FILMS AND BAGS WITH INCREASED HAZE

BACKGROUND OF THE INVENTION

1. The Field of the Invention

The present invention relates generally to thermoplastic films. Specifically, the invention relates to stretched thermoplastic films with increased haze or opacity.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many attempt to control manufacturing costs by decreasing the amount of thermoplastic material in a given product.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

To MDO a film, manufacturers commonly heat the film to an elevated temperature and stretch the film in the machine direction. Commonly, manufacturers will stretch the thermoplastic film between approximately 300 to 500 percent of the film's original length or more.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

Stretched films of reduced thickness can allow manufacturers to use less thermoplastic material to form a product of a given surface area or size. Reducing the gauge (i.e., thickness) of a film; however, can make the film more transparent or translucent. Consumers commonly associate thinner films and/or transparent films with weakness; and thus, may be dissuaded to purchase stretched films. Manufacturers may add pigments and/or additives, such as $TiO_2$ or voiding agents, to add either color and/or opacity to thinner films. Unfortunately, additives, such as $TiO_2$ and voiding agents can be expensive and/or often negatively impact the film strength properties, especially as the additive concentration is increased. Furthermore, even pigmented films commonly become less opaque upon stretching.

Optical measurement affecting opacity include light transmission, haze, and clarity. Light transmission is a measure of how much light is absorbed when passing through a film. Haze measures wide angle light scattering, and is a way of quantifying how well one can see contrast through films. Clarity measures narrow angle light scattering, and is a way of quantifying the ability to resolve detail through a film. ASTM D1003-11 or the *Standard Test Method for Haze and Luminous Transmittance of Transparent Plastics* describes how haze and other optical properties of films can be measured. ASTM D1003-11 is hereby incorporated by reference in its entirety.

The increasing the transparency or decreasing the opacity of a film upon stretching may dissuade manufacturers to stretch a film or use thinner films despite the potential material savings. For example, one common use of thermoplastic films is as bags for liners in trash or refuse receptacles. Many consumers may prefer opaque and non-transparent trash bags that prevent others (i.e., neighbors) from viewing the contents in the trash bag.

Accordingly, there are a number of considerations to be made in thermoplastic films and manufacturing methods.

BRIEF SUMMARY OF THE INVENTION

Implementations of the present invention solve one or more problems in the art with apparatus and methods for increasing the haze of a film. In particular, one or more implementations of the present invention include MD incrementally-stretched films, and products formed therewith, that have maintained or increased haze. Additionally, one or more implementations of the present invention include methods of incrementally-stretching films to reduce their gauge by weight, while maintaining or increasing the films' haze.

For example, one implementation of an incrementally-stretched film with increased haze formed by stretching a thermoplastic film can include a thermoplastic material and a ribbed pattern. The ribbed pattern can include thicker and thinner linear ribs extending across the incrementally-stretched thermoplastic film. The incrementally-stretched film can have a haze that is greater than a first haze of the thermoplastic film.

Additionally, one or more implementations of the present invention include a thermoplastic bag that includes a first sidewall and a second side wall. The first sidewall can include an incrementally-stretched film formed by stretching a thermoplastic film. The second sidewall can be joined to the first sidewall along a first side edge, an opposing second side edge, and along a bottom edge. At least a portion of the respective top edges of the first and second sidewalls can define an opening of the thermoplastic bag. The thermoplastic bag can also include a first set of alternating thicker and thinner linear ribs in first and second sidewalls. Furthermore, the first sidewall can have a haze that is approximately equal to or greater than a first haze of the thermoplastic film.

In addition to the forgoing, a method of enhancing one or more physical properties of a thermoplastic film can involve providing a film of a thermoplastic material with a first haze and a first gauge by weight. The method can also involve forming a machine-direction incrementally-stretched film by cold machine-direction ring rolling the film. The machine-direction incrementally-stretched film can have a second haze that is equal to or greater than the first haze. In one or more implementations, the machine-direction incrementally-stretched film can also have a second gauge by weight that is less than about 0.98 times the first gauge by weight.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
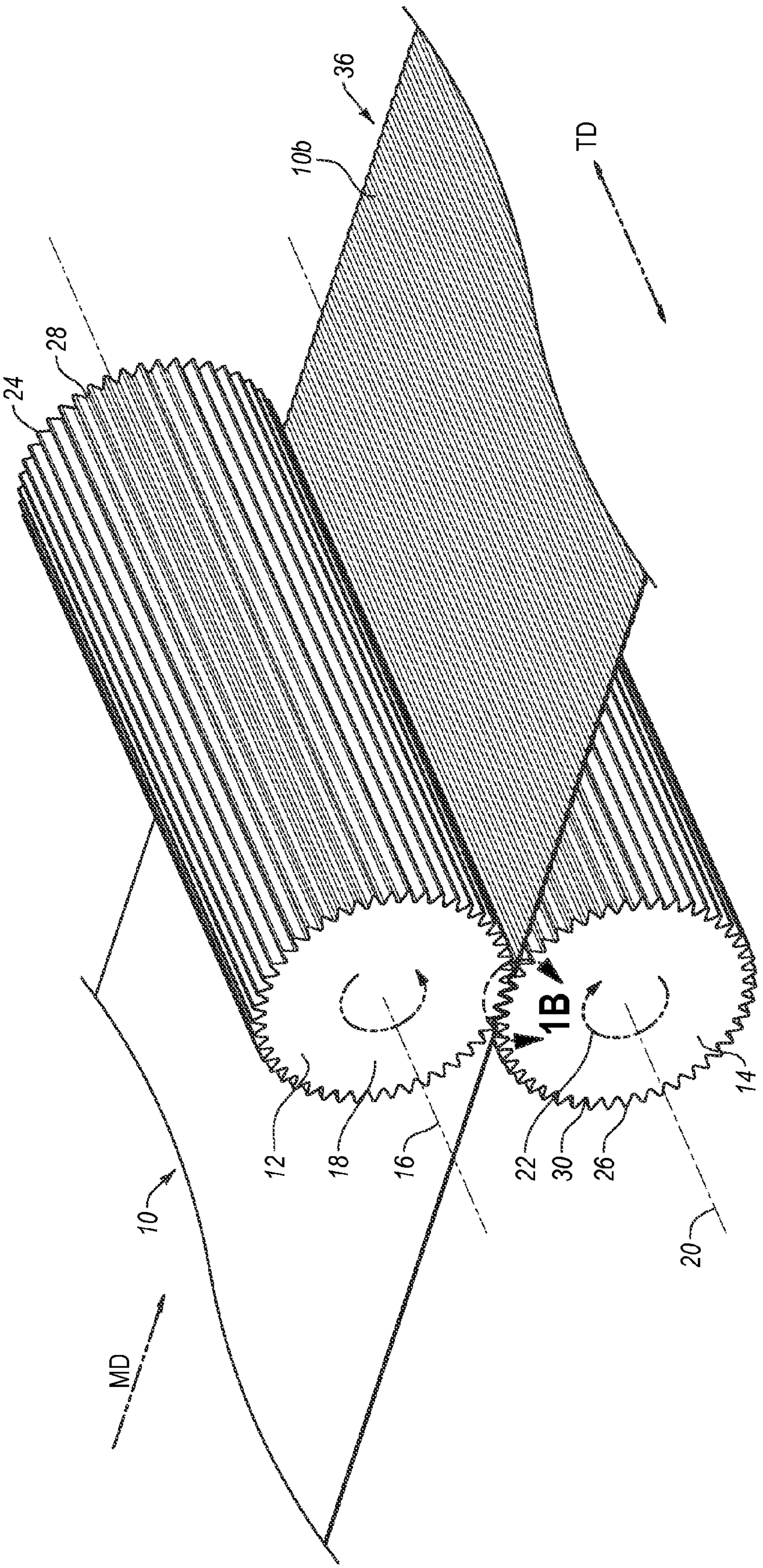
FIG. 1A illustrates a schematic diagram of a thermoplastic film being incrementally stretched by MD intermeshing rollers in accordance with one or more implementations of the present invention.

One or more implementations of the present invention include apparatus and methods for increasing the haze of a film. In particular, one or more implementations of the present invention include MD incrementally-stretched films, and products formed therewith, that have maintained or increased haze. Additionally, one or more implementations of the present invention include methods of incrementally-stretching films to reduce their gauge by weight, while maintaining or increasing the films' haze.

Indeed, one or more implementations of the present invention can provide thermoplastic films, and products made there from, with reduced gauge yet maintained or increased haze or opacity. In other words, one or more implementations can provide thinner films without making the film more transparent or translucent. Thus, one or more implementations can reduce the material needed to produce a product without compromising important material properties, such as opacity. One will appreciate in light of the disclosure herein that such material reductions can provide significant cost savings.

Additionally, consumers may associate thinner films with decreased strength. Indeed, such consumers may feel that they are receiving less value for their money when purchasing thermoplastic film products with thinner gauges. One will appreciate in light of the disclosure herein that a consumer may not readily detect that one or more incrementally-stretched films of the present invention have a reduced gauge. In particular, by maintaining or increasing the haze of the film upon stretching, the consumer may perceive the film as being thicker and/or having increased strength.

As explained in greater detail below, one or more implementations of the present invention allow for maintained or increased haze without, or with less use, of additives, such as pigments or voiding agents, to color or add opacity to a film. The reduction in additives can lead to significant cost savings. Additionally, the use of no, or less, additives can reduce or eliminate strength degradation associated with many additives.

As alluded to previously, one or more implementations include methods of incrementally stretching a film with the unexpected result of maintaining or increasing the haze of the film. In particular, as will be described in greater detail below, one or more implementations provide synergistic effects when incrementally cold-stretching thermoplastic films in the machine direction. Indeed, the films of the present invention can undergo one or more film stretching processes under ambient or cold (non-heated) conditions. This differs significantly from most conventional processes that stretch films under heated conditions. Typically, haze decreases and light transmission increases when films are stretched via traditional MDO processes.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material which may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. For examples, the films can include pigments, slip agents, anti-block agents, or tackifiers. The pigments can include $TiO_2$, or other pigments, that can impart a color and/or opacity to the film. One or more implementations of the present invention include films devoid of pigments. Additionally, one or more implementations of the present invention include films devoid of voiding agents. Some examples of voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc.

One will appreciate in light of the disclosure herein that manufacturers may form the films or webs to be used with the present invention using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

Additionally, one or more implementations include incrementally stretching the film under ambient or cold (non-heated) conditions. Furthermore, one or more implementations include stretching the film at ratios less than about 1:3. In other words, one or more implementations include stretching the film less than about 3 times its original dimension (e.g., length, width). Suitably one or more implementations include stretching the film less than about 1.5 times its original dimension (e.g., length, width).

Figure 1B:
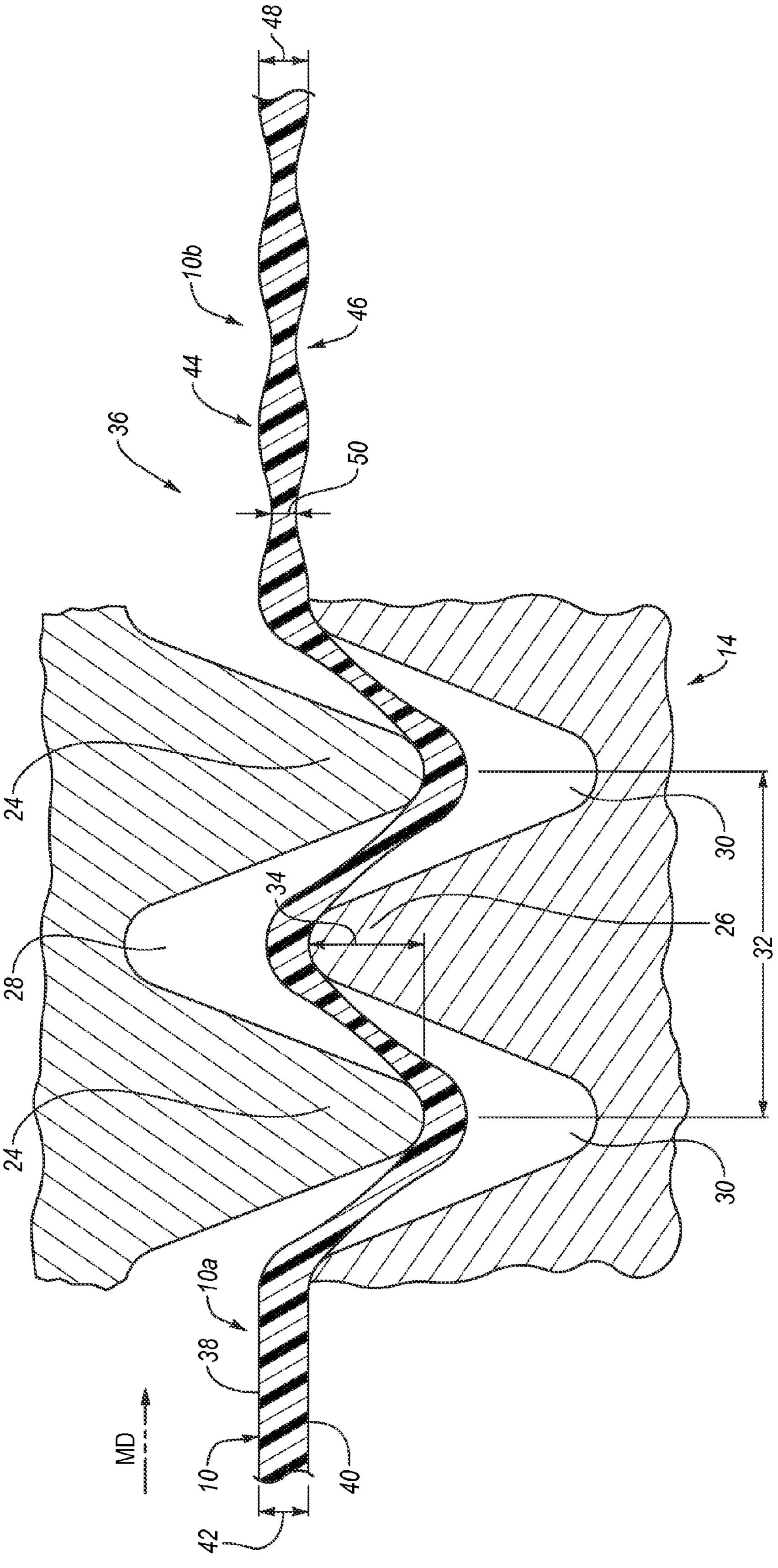
FIG. 1B illustrates an enlarged view of a portion of the thermoplastic film passing through the MD intermeshing rollers of FIG. 1A taken along the circle 1B of FIG. 1A.

FIGS. 1A and 1B illustrate one exemplary process of incrementally stretching a thermoplastic film in the machine direction in accordance with an implementation of the present invention. In particular, FIGS. 1A and 1B illustrate an MD ring rolling process that incrementally stretches a thermoplastic film 10 by passing the film 10 through a pair of MD intermeshing rollers 12, 14. As explained in greater detail below, the MD ring rolling processes of the present invention can stretch the film 10 in the machine direction, while maintaining or increasing the haze or other properties of the film 10.

As shown by the FIGS. 1A and 1B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite direction about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The MD intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount of stretching caused by the MD intermeshing rollers 12, 14.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the MD intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different MD intermeshing rollers 12, 14 during intermeshing. The ratio of DOE 34 to pitch 32 can determine, at least in part, the amount of stretch imparted by a pair of MD intermeshing rollers 12, 14.

As shown by FIG. 1A, the direction of travel of the film 10 through the MD intermeshing rollers 12, 14 is parallel to the machine direction and perpendicular to the transverse direction. As the thermoplastic film 10 passes between the MD intermeshing rollers 12, 14, the ridges 24, 26 can incrementally stretch the film 10 in the machine direction. In some implementations, stretching the film 10 in the machine direction can reduce the gauge of the film and increase the length of the film 10. In other implementations, the film 10 may rebound after being stretched such that the gauge of the film 10 is not decreased. Furthermore, in some implementations, stretching the film 10 in the machine direction can reduce the width of the film 10. For example, as the film 10 is lengthened in the machine direction, the film's length can be reduced in the transverse direction.

In particular, as the film 10 proceeds between the MD intermeshing rollers 12, 14, the ridges 24 of the first roller 12 can push the film 10 into the grooves 30 of the second roller 14 and vice versa. The pulling of the film 10 by the ridges 24, 26 can stretch the film 10. The MD intermeshing rollers 12, 14 may not stretch the film 10 evenly along its length. Specifically, the rollers 12, 14 can stretch the portions of the film 10 between the ridges 24, 26 more than the portions of the film 10 that contact the ridges 24, 26. Thus, the MD intermeshing rollers 12, 14 can impart or form a ribbed pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 1A and 1B, the ribbed pattern 36 formed by the MD ring rolling process can be visually perceivable. As used herein, the term "visually perceivable" refers to features that are readily discernible to the normal naked eye. In particular, visually perceivable features can be readily discernible to the normal naked eye when a film 10 including the features is subjected to normal use.

In one or more implementations, prior to passing through the MD intermeshing rollers 12, 14, the film 10 may not include a visually perceivable ribbed pattern. For example, FIGS. 1A and 1B illustrate that the un-stretched film 10 (i.e., the film that is yet to pass through the intermeshing rollers 12, 14) can have a substantially flat top surface 38 and substantially flat bottom surface 40. The un-stretched film 10 can have an initial thickness or starting gauge 42 extending between its major surfaces (i.e., the top surface 38 and the bottom surface 40). In at least one implementation, the starting gauge 42 can be substantially uniform along the length of the un-stretched film 10.

For purposes of the present invention, the un-stretched film 10 need not have an entirely flat top surface 38. Indeed, the top surface 38 can be rough or uneven. Similarly, bottom surface 40 of the un-stretched film 10 can also be rough or uneven. Further, the starting gauge 42 need not be consistent or uniform throughout the entirety of un-stretched film 10. Thus, the starting gauge 42 can vary due to intentional product design, manufacturing defects, tolerances, or other processing inconsistencies.

FIGS. 1A and 1B illustrate the MD intermeshing rollers 12, 14 can process the un-stretched film 10 into an MD incrementally-stretched film 10*b*. As previously mentioned, the MD incrementally-stretched film 10*b* can include a ribbed pattern 36. The ribbed pattern 36 can include alternating series of thicker sections or ribs 44 and thinner sections or ribs 46. The thicker ribs 44 can comprise "un-stretched" regions and the thinner ribs 46 can comprise stretched regions. In one or more implementations, the thicker ribs 44 regions of the incrementally-stretched films may be stretched to a small degree. In any event, the thicker ribs 44 are stretched less compared to the thinner ribs 46. The ribs 44, 46 can extend across the MD incrementally-stretched film 10*b* in the transverse direction.

The thicker ribs 44 can have a first average thickness or gauge 48. The first average gauge 48 can be approximately equal to the starting gauge 42. In one or more implementations, the first average gauge 48 can be less than the starting gauge 42. The thinner ribs 46 can have a second average thickness or gauge 50. The second average gauge 50 can be less than both the starting gauge 42 and the first average gauge 48.

One will appreciate in light of the disclosure herein that the ribbed pattern 36 may vary depending on the method used to incrementally stretch the film 10. To the extent that MD ring rolling is used to incrementally stretch the film 10, the ribbed pattern 36 on the film 10 can depend on the pitch 32 of the ridges 24, 26, the DOE 34, and other factors. In some implementations, the molecular structure of the thermoplastic material of the film 10 may be rearranged to provide this shape memory.

Figure 2:
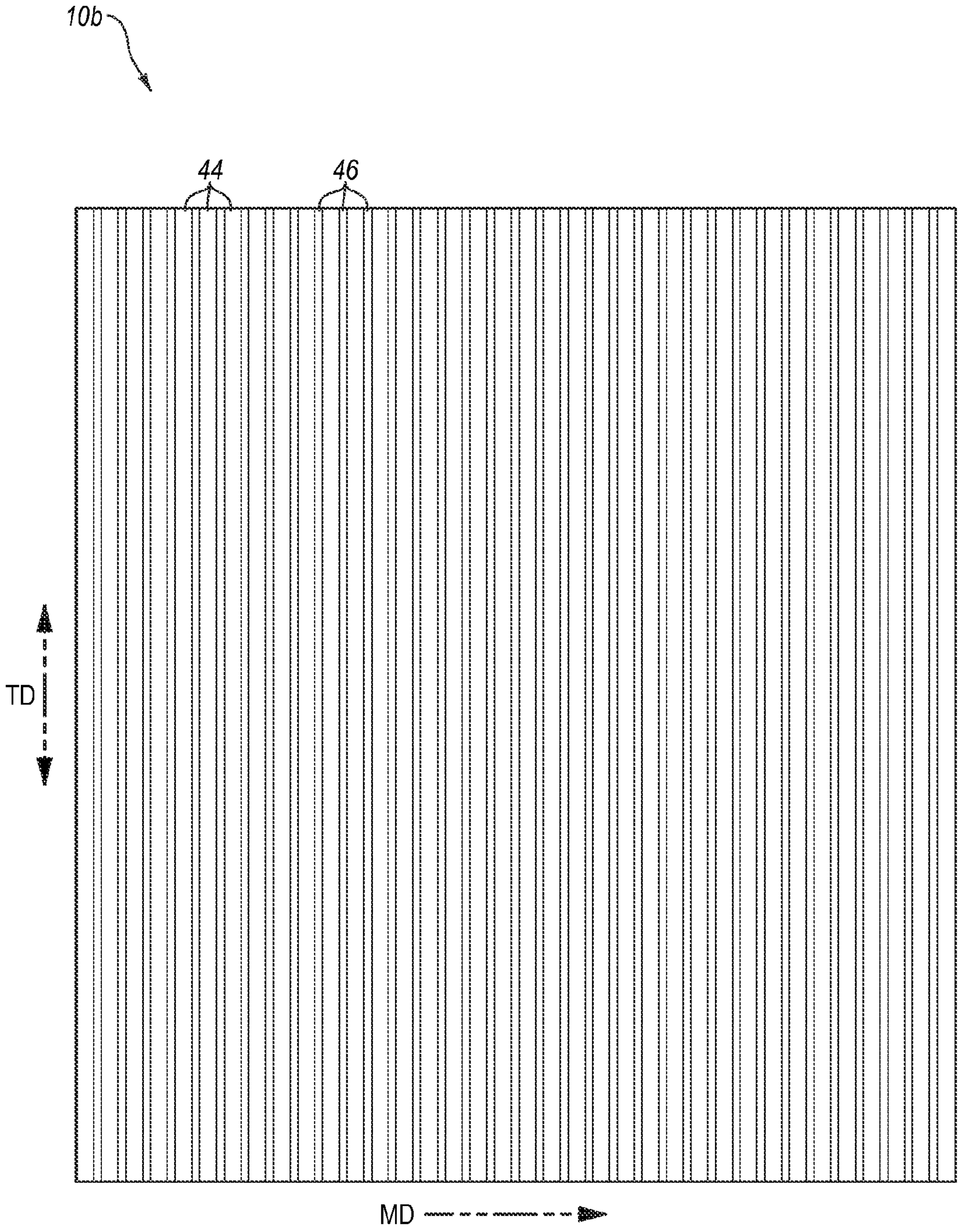
FIG. 2 illustrates a view of a MD incrementally-stretched thermoplastic film with maintained or increased haze created by passing through the MD intermeshing rollers of FIG. 1A.

FIG. 2 illustrates a top view of the MD incrementally-stretched film 10*b*. The ribs 44, 46 can extend across the film 10*b* in a direction transverse (i.e., transverse direction) to a direction in which the film was extruded (i.e., machine direction). As shown by FIG. 2, ribs 44, 46 can extend across the entire length of the film 10*b*. The pitch 32 and the DOE 34 of the ridges 24, 26 of the MD intermeshing rollers 12, 14 can determine the width and spacing of the ribs 44, 46. Thus, as explained in greater detail below, by varying the pitch 32 and/or DOE 34, the width and/or spacing of the ribs 44, 46, the amount of stretching the film undergoes, and the effects of the stretching on the physical properties can be varied.

FIG. 2 further illustrates that the thinner ribs 46 can be intermittently dispersed about thicker ribs 44. In particular, each thinner rib 46 can reside between adjacent thicker ribs 44. Additionally, in one or more implementations the thicker ribs 44 can be visually distinct from the thinner ribs 46.

Additionally, in one or more implementations, despite having a reduced gauge, the MD incrementally-stretched film 10*b* have maintained or increased haze or opacity. The opacity of the MD incrementally-stretched film 10*b* can result in a pleasing appearance and connote strength to a consumer. One will appreciate in light of the disclosure herein that a maintained or increased haze in the MD incrementally-stretched film 10*b* is an un-expected result as stretching a film typically results in increased transparency (i.e., reduced haze or opacity). The haze of a film is a measurement of wide angle light scattering (>2.6°) and is a way of quantifying how well one can see contrast through films. The haze value of a film can be measured according to the methods and procedures set form in ASTM D 1003.

The ribs 44, 46 or ribbed pattern 36 can signify that the film 10*b* has undergone a transformation to modify one or more characteristics of the film 10*b*. For example, MD ring rolling the film 10 can increase or otherwise modify one or more of the haze, light transmittance, tensile strength, tear resistance, impact resistance, or elasticity of the film 10*b*. The ribbed pattern 36 can signify the physical transformation to a consumer.

As alluded to earlier, MD ring rolling a film can increase or maintain the haze or opacity of the MD incrementally-stretched film 10*b* despite a reduction in gauge. The increase in haze can be based at least on part on the ratio of MD DOE to pitch. Furthermore, the ratio of MD DOE to pitch that will maintain or increase the haze of a particular film can also be based on one or more of the orientation of the film, the thermoplastic material of the film, and the starting gauge of the film. The following example presents the results of a series of tests performed on thermoplastic films that have been incrementally stretched in the machine direction. These examples are illustrative of the invention claimed herein and should not be construed to limit in any way the scope of the invention.

Example 1

Figure 3:
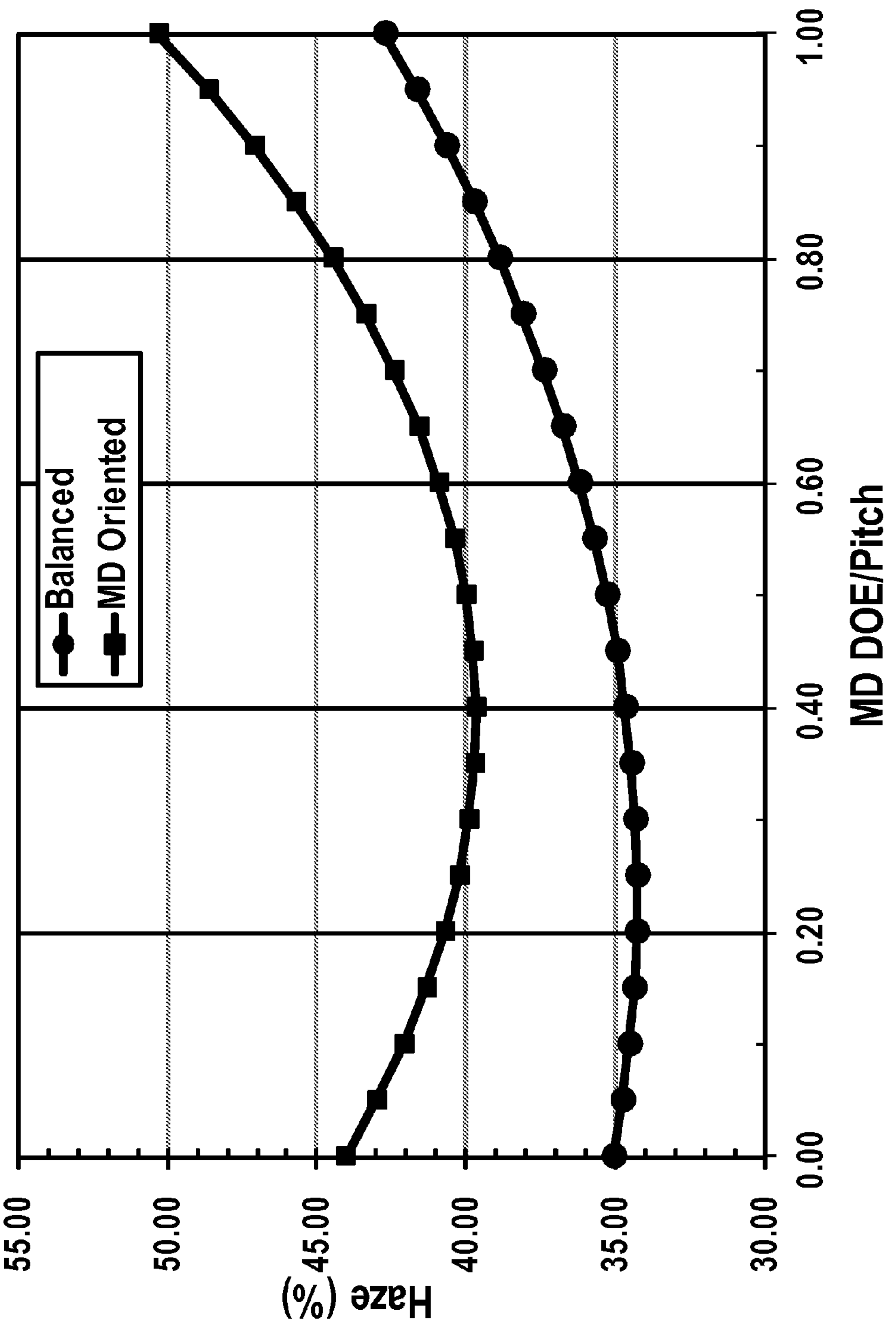
FIG. 3 is a chart that graphs, for two specific thermoplastic films having different orientations, the relationship between the ratio of MD depth-of-engagement to pitch and haze in accordance with one or more implementations of the present invention.

In a first example, two mono-layer base films were MD incrementally stretched using a cold MD ring rolling process similar to that described herein above. The two films were hexene gas phase LLDPE films. Neither of the films contained pigments or voiding agents. One of the films had a balanced orientation, while the other film was predominantly MD oriented. The intermeshing rolls used in Example 1 had a 5.933" diameter, 0.100" pitch, 30 diametral pitch, and a 14½° pressure angle. The MD DOE to pitch ratio used to stretch the films varied from between 0 and 1.0. The haze of these films was measured according to the methods and procedures set forth in ASTM D1003. FIG. 3 is a chart that graphs the relationship between these films' haze (y-axis) and the DOE to pitch ratio used to incrementally stretch the film in the machine direction (x-axis).

As shown by FIG. 3, the unexpected result of maintaining or increasing haze of an MD incrementally-stretched film can be based on the MD DOE to pitch ratio used to stretch the films. For example, as shown by particularly shown by the MD predominantly oriented film, some MD DOE to pitch ratios will maintain or increase the haze of the film (i.e., ratios between about 0.75 and 1.0), while other MD DOE to pitch ratios will not maintain or increase the haze of the film (i.e., ratios between about 0 and about 0.75).

FIG. 3 further illustrates that the MD DOE to pitch ratio that produces a maintained or increased haze can be based at least in part on the orientation of the film. Specifically, MD DOE to pitch ratios between about 0.40 and 1.0 maintained or increased the haze in the balanced film, while MD DOE to pitch ratios between about 0.80 and 1.0 maintained or increased the haze in the predominantly MD oriented film.

Example 2

In a second example, the same two mono-layer base films of Example 1 were MD incrementally stretched using a cold MD ring rolling process similar to that described herein above. The intermeshing rolls used in Example 2 had a 5.933" diameter, 0.100" pitch, 30 diametral pitch, and a 14½° pressure angle. The MD DOE to pitch ratio used to stretch the films were 0.50 and 1.0. The haze, light transmission, clarity, and gauge by weight of these films were measured. Table I lists the physical properties of these films along with the physical properties the un-stretched, base films.

TABLE I

| Physical Properties | | | | | | |
|---|---|---|---|---|---|---|
| Film | MD DOE/ Pitch | Light Transmission (%) | Haze (%) | Relative Haze (%) | Clarity (%) | Relative Gauge by Weight (%) |
| Balanced | 0 | 94.3 | 40.4 | 100 | 49 | 100 |
| Balanced | 0.50 | 93.9 | 34.9 | 86 | 49.1 | 97 |
| Balanced | 1.0 | 93.7 | 45.2 | 112 | 32.8 | 81 |
| Predominantly MD Oriented | 0 | 94.2 | 31.6 | 100 | 68.4 | 100 |
| Predominantly MD Oriented | 0.50 | 94.3 | 32.1 | 102 | 66.9 | 108 |
| Predominantly MD Oriented | 1.0 | 93.5 | 41.2 | 130 | 53.3 | 74 |

The results from Table I indicate that the MD incrementally-stretched films under certain conditions can have a maintained or increased haze. Specifically, in some instances the MD haze can be as great as 1.3 times the un-stretched film. Additionally, the results from Table I show that the MD incrementally-stretched films can have a decrease in light transmission and/or clarity.

Table I also shows that the incrementally-stretched films can include a maintained or increased haze despite a reduction in gauge. One will appreciate in light of the disclosure herein that this is an unexpected result, as haze is expected to decrease as the gauge of the film decreases. For example, Table I illustrates that films processed according to one or more implementations of the present invention can include a 12% increase in haze, while also having a 19% decrease in gauge by weight. In further implementations, Table I illustrates that MD stretched films can include a 30% increase in haze, while also having a 26% decrease in gauge by weight. In addition to providing films with increased haze and reduced gauge by weight, alternative implementations can provide films with maintained haze and reduced gauge by weight. Still further implementations can provide increased haze and maintained gauge by weight.

Table I further illustrates that the predominantly MD oriented film showed greater increases in haze compared to the balanced film. In particular, at an MD DOE to pitch ratio of 1, the predominantly MD oriented film had an increase in haze of 30%, while the balanced film had an increase in haze of 12%. Thus, one or more implementations of the present invention include adding MD orientation to films prior to MD ring rolling the films to allow for a greater increase in haze. For example, one or more implementations can involve extruding the films at faster rates, processing the films through high speed production lines, or otherwise inducing additional MD orientation to the film. Such measures can provide for greater increases in haze upon MD ring rolling, while also reducing production costs.

Figure 4:
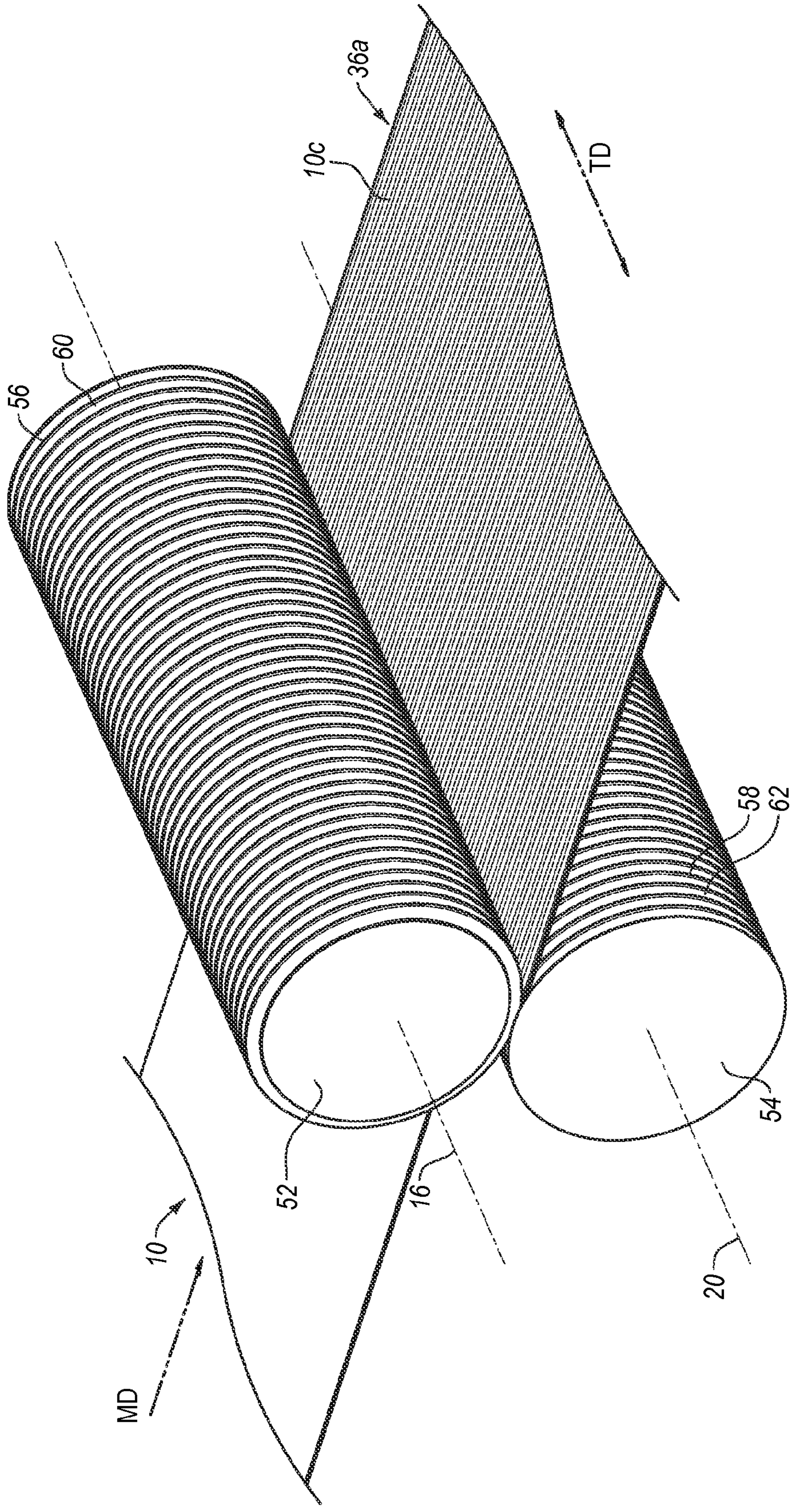
FIG. 4 illustrates a schematic diagram of a thermoplastic film being incrementally stretched by TD intermeshing rollers in accordance with one or more implementations of the present invention.

In addition to MD ring rolling, implementations of the present invention additionally, or alternatively, include using TD ring rolling to incrementally stretch a thermoplastic film to enhance, or otherwise modify, physical properties of the film. For example, FIG. 4 illustrates a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 16, 20.

Thus, as shown by FIG. 4, as the thermoplastic film 10 passes between the intermeshing rollers 52, 54, the ridges 56, 58 can incrementally stretch the film 10 in the transverse direction. In particular, as the film 10 proceeds between the intermeshing rollers 52, 54, the ridges 56, 58 can impart or form a ribbed pattern **36*a* into the film 10 to form a TD incrementally-stretched film 10*c***.

Similar to an MD ring rolling process, the pitch and depth of engagement of the ridges 56, 58 can determine, at least in part, the amount of incremental stretching created by the TD intermeshing rollers 52, 54. The ratio of TD DOE to pitch can determine, at least in part, the amount of stretch imparted by a pair of TD intermeshing rollers 52, 54, and the effect upon the haze of the film. 10.

As shown by FIG. 4, the direction of travel of the film 10 through the TD intermeshing rollers 52, 54 is parallel to the machine direction and perpendicular to the transverse direction. As the thermoplastic film 10 passes between the TD intermeshing rollers 52, 54, the ridges 56, 58 can incrementally stretch the film 10 in the transverse direction. In some implementations, stretching the film 10 in the transverse direction can reduce the gauge of the film and increase the width of the film 10. In other implementations, the film 10 may rebound after stretching such that the gauge of the film 10 is not decreased. Furthermore, in some implementations, stretching the film 10 in the transverse direction can reduce the length of the film 10. For example, as the width of the film 10 is increased, the film's length can be reduced.

In particular, as the film 10 proceeds between the TD intermeshing rollers 52, 54, the ridges 56 of the first roller 52 can push the film 10 into the grooves 62 of the second roller 54 and vice versa. The pulling of the film 10 by the ridges 56, 58 can stretch the film 10. The TD intermeshing rollers 52, 54 may not stretch the film 10 evenly along its length. Specifically, the rollers 56, 58 can stretch the portions of the film 10 between the ridges 56, 58 more than the portions of the film 10 that contact the ridges 56, 58. Thus, the TD intermeshing rollers 52, 54 can impart or form a ribbed pattern **36*a* into the film 10**.

Figure 5:
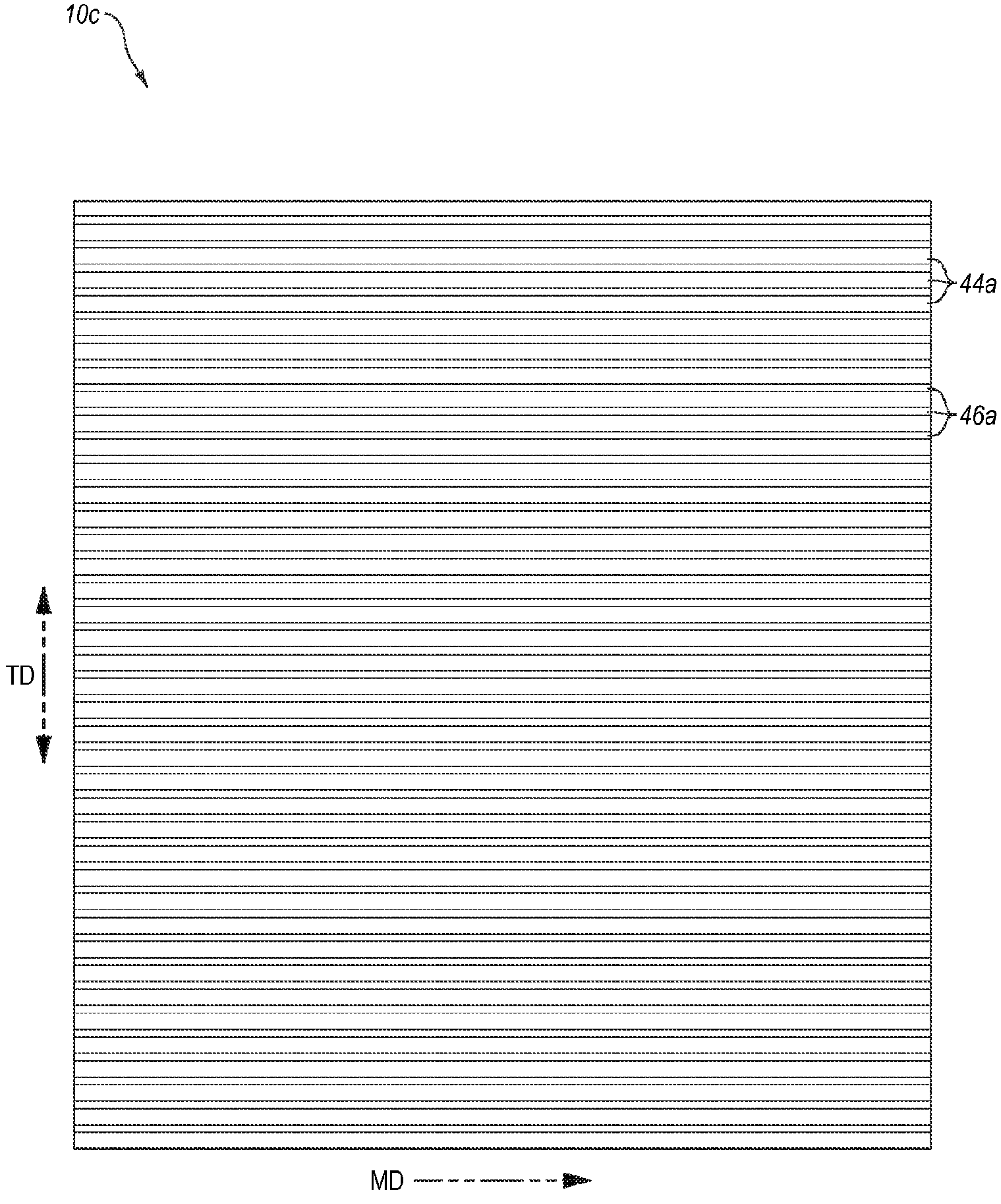
FIG. 5 illustrates a view of a TD incrementally-stretched thermoplastic film created by passing through the TD intermeshing rollers of FIG. 4.

FIG. 5 illustrates a top view of the TD incrementally-stretched film **10*c*. As shown, the TD incrementally-stretched film 10*c* can include ribs 44*a*, 46*a* that extend across the film 10*c* in the direction in which the film was extruded (i.e., machine direction). As shown by FIG. 5, ribs 44*a*, 46*a* can extend across the entire length of the film 10***c*. The pitch and the DOE of the ridges 56, 58 of the TD intermeshing rollers 52, 54 can determine the width and spacing of the ribs 44*a*, 46*a*. Thus, as explained in greater detail below, by varying the pitch and/or DOE, the width and/or spacing of the ribs 44*a*, 46*a*, the amount of stretching the film undergoes, and the effects of the stretching on the haze can be varied.

The ribbed pattern 36*a* can include alternating series of thicker sections or ribs 44*a* and thinner sections or ribs 46*a*. The thicker ribs 44*a* can comprise "un-stretched" regions and the thinner ribs 46*a* can comprise stretched regions. In one or more implementations, the thicker ribs 44*a* regions of the incrementally-stretched films may be stretched to a small degree. In any event, the thicker ribs 44*a* are stretched less compared to the thinner ribs 46*a*.

The thicker ribs 44*a* can have a first average thickness or gauge. The first average gauge can be approximately equal to a starting gauge of the film 10. In one or more implementations, the first average gauge can be less than the starting gauge. The thinner ribs 46*a* can have a second average thickness or gauge. The second average gauge can be less than both the starting gauge and the first average gauge.

One will appreciate in light of the disclosure herein that the ribbed pattern 36*a* may vary depending on the method used to incrementally stretch the film 10. To the extent that TD ring rolling is used to incrementally stretch the film 10, the ribbed pattern 36*a* on the film 10 can depend on the pitch of the ridges 56, 58, the DOE, and other factors. In some implementations, the molecular structure of the thermoplastic material of the film 10 may be rearranged to provide this shape memory.

FIG. 5 further illustrates that the thinner ribs 46*a* can be intermittently dispersed about thicker ribs 44*a*. In particular, each thinner rib 46*a* can reside between adjacent thicker ribs 44*a*. The ribs 44*a*, 46*a* or ribbed pattern 36*a* can provide a pleasing appearance and connote strength to a consumer. For example, the ribbed pattern 36*a* can signify that the film 10*c* has undergone a transformation to modify one or more characteristics of the film 10*c*. For example, TD ring rolling the film 10 can increase or otherwise modify one or more of the haze, tensile strength, tear resistance, impact resistance, or elasticity of the film 10*c*. The ribbed pattern 36*a* can signify the transformation to a consumer.

The haze of the TD incrementally-stretched film 10*c* can be based at least on part on the ratio of TD DOE to pitch. Furthermore, the ratio of TD DOE to pitch that will maintain or increase the haze of a particular film can also be based on one or more of the orientation of the film, the thermoplastic material of the film, and the starting gauge of the film. The following example presents the results of a series of tests performed on thermoplastic films that were incrementally stretched in the transverse direction. This example is illustrative of the invention claimed herein and should not be construed to limit in any way the scope of the invention.

Example 3

In a third example, the same two mono-layer base films as used in Examples 1 and 2 were TD incrementally stretched using a cold TD ring rolling process similar to that described herein above. The TD intermeshing rolls used in Example 3 had a 0.040" pitch. The TD DOE to pitch ratio used to stretch the films varied from between 0 and 1.0. The haze of these films was measured according to the methods and procedures set forth in ASTM D1003. The haze, light transmission, clarity, and gauge by weight of these films were measured. Table II lists the physical properties of these films along with the physical properties of the un-stretched, base films.

TABLE II

| Physical Properties | | | | | | |
|---|---|---|---|---|---|---|
| Film | TD DOE/ Pitch | Light Transmission (%) | Haze (%) | Relative Haze (%) | Clarity (%) | Relative Gauge by Weight (%) |
| Balanced | 0 | 94.3 | 40.4 | 100 | 49 | 100 |
| Balanced | 0.50 | 93.7 | 43.8 | 108 | 49.5 | 88 |
| Balanced | 0.75 | 93.3 | 40.7 | 101 | 52.5 | 73 |
| Balanced | 1.0 | 92.8 | 37.5 | 93 | 56.8 | 61 |
| Predominantly MD Oriented | 0 | 94.2 | 31.6 | 100 | 68.4 | 100 |
| Predominantly MD Oriented | 0.50 | 94.0 | 36.3 | 115 | 59.6 | 95 |
| Predominantly MD Oriented | 1.0 | 93.4 | 37.3 | 118 | 61.3 | 68 |

The results from Table II indicate that the TD incrementally-stretched film under certain conditions can have a maintained or increased haze. Specifically, in some instances the TD haze can be as great as 1.18 times the un-stretched film. Additionally, the results from Table II show that the TD incrementally-stretched films can have a decrease in light transmission and/or clarity.

Table II also shows that the TD incrementally-stretched films, under certain conditions, can include a maintained or increased haze despite a reduction in gauge. One will appreciate in light of the disclosure herein that this is an unexpected result, as haze is expected to decrease as the gauge of the film decreases. For example, Table II illustrates that TD incrementally-stretched films processed according to one or more implementations of the present invention can include an 8% increase in haze, while also having a 12% decrease in gauge by weight. In further implementations, Table II illustrates that TD incrementally-stretched films can include an 18% increase in haze, while also having a 32% decrease in gauge by weight. In addition to providing films with increased haze and reduced gauge by weight, alternative implementations can provide films with maintained hazed and reduced gauge by weight or increased haze and maintained gauge by weight.

Table II further illustrates that the predominantly MD oriented film showed greater increases in haze compared to the balanced film. In particular, at a TD DOE to pitch ratio of 1, the predominantly MD oriented film had an increase in haze of 18%, while the balanced film had a decrease in haze of 7%. Thus, one or more implementations of the present invention include adding MD orientation to films prior to TD ring rolling the films to allow for a greater increase in haze.

Figure 6:
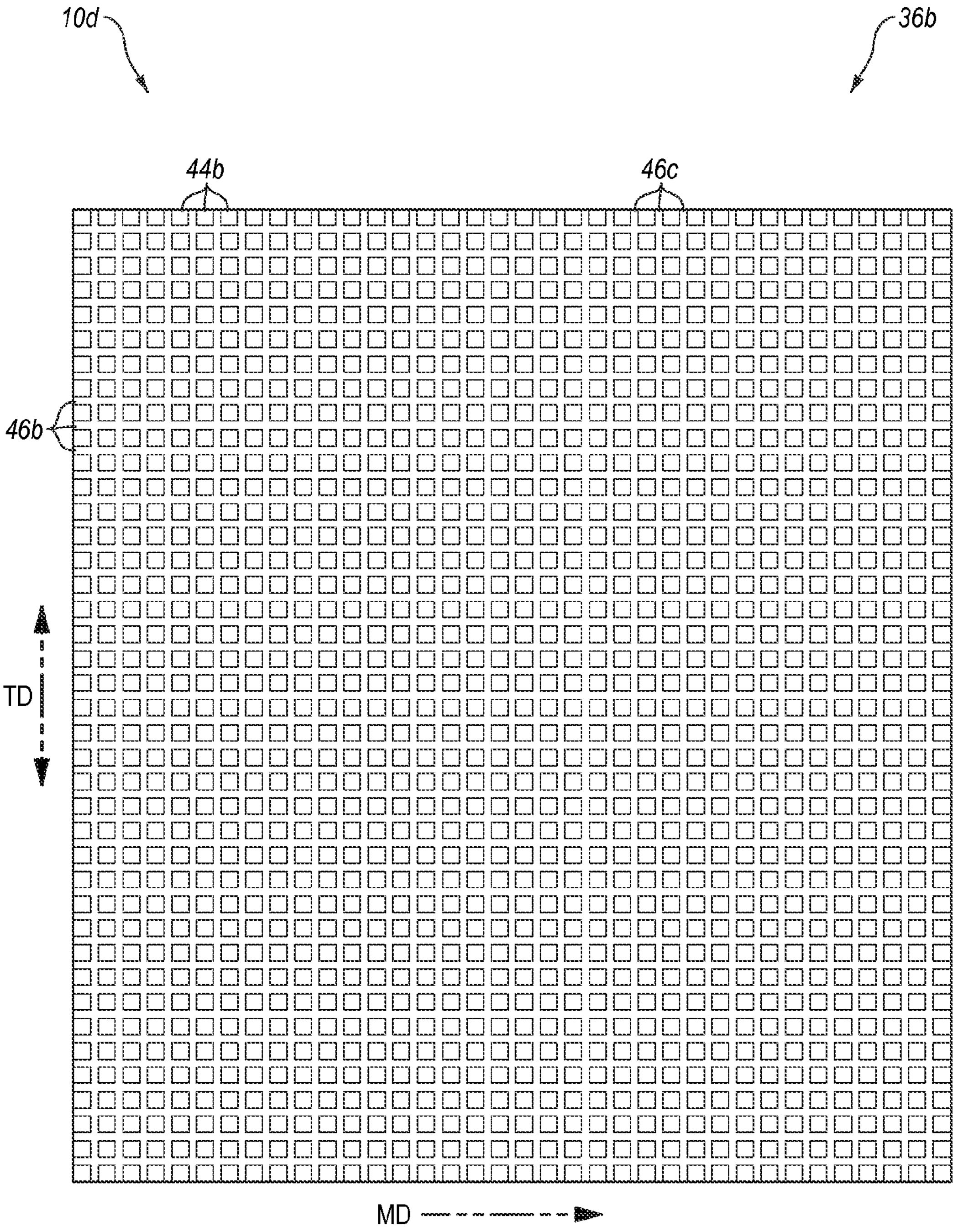
FIG. 6 illustrates a view of a thermoplastic film with maintained or increased haze created by the intermeshing rollers of both FIG. 1 and FIG. 4.

In still further implementations, a film 10 can undergo both an MD ring rolling process and a TD ring rolling process to further enhance, or otherwise modify, the physical properties of the film (such as haze). For example, FIG. 6 illustrates a top view of an incrementally-stretched film 10*d* created by MD and TD ring rolling. The incrementally-stretched film 10*d* can have a ribbed or checker board pattern 36*b*. The ribbed pattern 36*b* can include alternating series of thicker ribs or regions 44*a* and thinner ribs 46*b*, 46*c*. The thinner ribs 46*b*, 46*c* can include ribs 46*b* that extend along the film 10*c* in the machine direction created by TD ring rolling, and ribs 46*c* that extend along the film in the transverse direction created by MD ring rolling. As shown by FIG. 6, in one or more implementations, the aspect ratio of the rows and columns of the stretched thinner ribs 46*b*, 46*c* can be approximately 1 to 1. In alternative implementations, the aspect ratio of the rows and columns of the rows and columns of the stretched thinner ribs 46*b*, 46*c* can be greater or less than 1 to 1.

The incrementally-stretched film 10*d* created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern 36*b* created by the thinner ribs 46*b*, 46*c* can signify these transformations to a consumer.

As alluded to earlier, the haze or other properties of the incrementally-stretched film 10*d* can be based at least on part on the ratios of TD and MD DOE to pitch. Furthermore, the ratios of TD and MD DOE to pitch that will maintain or increase the haze or other properties of a particular film can be based on one or more of the orientation of the film, the thermoplastic material of the film, and the starting gauge of the film. The following example presents the results of a series of tests performed on thermoplastic films that have been incrementally stretched in the machine direction and transverse directions. This example is illustrative of the invention claimed herein and should not be construed to limit in any way the scope of the invention.

Example 4

In a fourth example, the same two mono-layer base films used in Examples 1-3 were MD and TD incrementally stretched using a cold ring rolling processes similar to that described herein above. The films were first MD ring rolled. The films were then TD ring rolled, and the effect of the TD ring rolling on the MD incrementally-stretched films was observed. The MD intermeshing rolls used in Example 4 had a 5.933" diameter, 0.100" pitch, 30 diametral pitch, and a 14½° pressure angle. The MD DOE to pitch ratio used to stretch the films varied from between 0 and 1.0. The TD intermeshing rolls used in Example 4 had a 0.040" pitch. The TD DOE to pitch ratio used to stretch the films varied from between 0 and 1.0. The haze of these films was measured according to the methods and procedures set forth in ASTM D1003. Table III lists the physical properties of these films along with the physical properties of the un-stretched, base films.

TABLE III

| Physical Properties | | | | | | | |
|---|---|---|---|---|---|---|---|
| Film | MD DOE/ Pitch | TD DOE/ Pitch | Light Transmission (%) | Haze (%) | Relative Haze (%) | Clarity (%) | Relative Gauge by Weight (%) |
| Balanced | 0 | 0 | 94.3 | 40.4 | 100 | 49 | 100 |
| Balanced | 0.50 | 0.50 | 93.8 | 38.4 | 95 | 48.2 | 88 |
| Balanced | 1.0 | 0.50 | 93.6 | 52.2 | 129 | 28.2 | 73 |
| Balanced | 0.50 | 1.0 | 93.1 | 36.3 | 91 | 62.7 | 57 |
| Balanced | 1.0 | 1.0 | 93.2 | 43.1 | 107 | 51.9 | 50 |
| Predominantly MD Oriented | 0 | 0 | 94.2 | 31.6 | 100 | 68.4 | 100 |
| Predominantly MD Oriented | 0.50 | 0.50 | 93.9 | 36.4 | 115 | 58.6 | 93 |
| Predominantly MD Oriented | 1.0 | 0.50 | 93.4 | 43.0 | 136 | 53.8 | 72 |
| Predominantly MD Oriented | 0.50 | 1.0 | 93.5 | 37.4 | 118 | 61.5 | 66 |
| Predominantly MD Oriented | 1.0 | 1.0 | 93.3 | 44.0 | 139 | 55.4 | 52 |

The results from Table III indicate that the MD and TD incrementally-stretched film under certain conditions can have a maintained or increased haze. Specifically, in some instances the TD haze can be as great as about 1.40 times the un-stretched film. Additionally, the results from Table III show that the MD and TD incrementally-stretched films can have a decrease in light transmission and/or clarity.

Table III also shows that the MD and TD incrementally-stretched films, under certain conditions, can include a maintained or increased haze despite a reduction in gauge. As previously mentioned, this is an unexpected result, as haze is expected to decrease as the gauge of the film decreases. For example, Table III illustrates that MD and TD incrementally-stretched films processed according to one or more implementations of the present invention can include a 40% increase in haze, while also having a 48% decrease in gauge by weight. In further implementations, Table III illustrates that TD incrementally-stretched films can include a 29% increase in haze, while also having a 27% decrease in gauge by weight. In addition to providing films with increased haze and reduced gauge by weight, alternative implementations can provide films with maintained hazed and reduced gauge by weight. Still further implementations can provide increased haze and maintained gauge by weight.

As shown by the various examples hereinabove, cold ring rolling can yield an increase in haze in one or more implementations. Additionally, in one or more implementations cold ring rolling can produce a reduction in film gauge, along with the unexpected result of maintained or increased haze. Furthermore, MD and TD cold ring rolling together can produce further gauge reductions with maintained or increased haze.

One will appreciate in light of the disclosure herein that the MD and/or TD incrementally-stretched films with maintained or increased haze can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include MD and/or TD incrementally-stretched with maintained or increased haze to one extent or another. Trash bags and food storage bags, in particular, may benefit by the films of the present invention.

Figure 7:
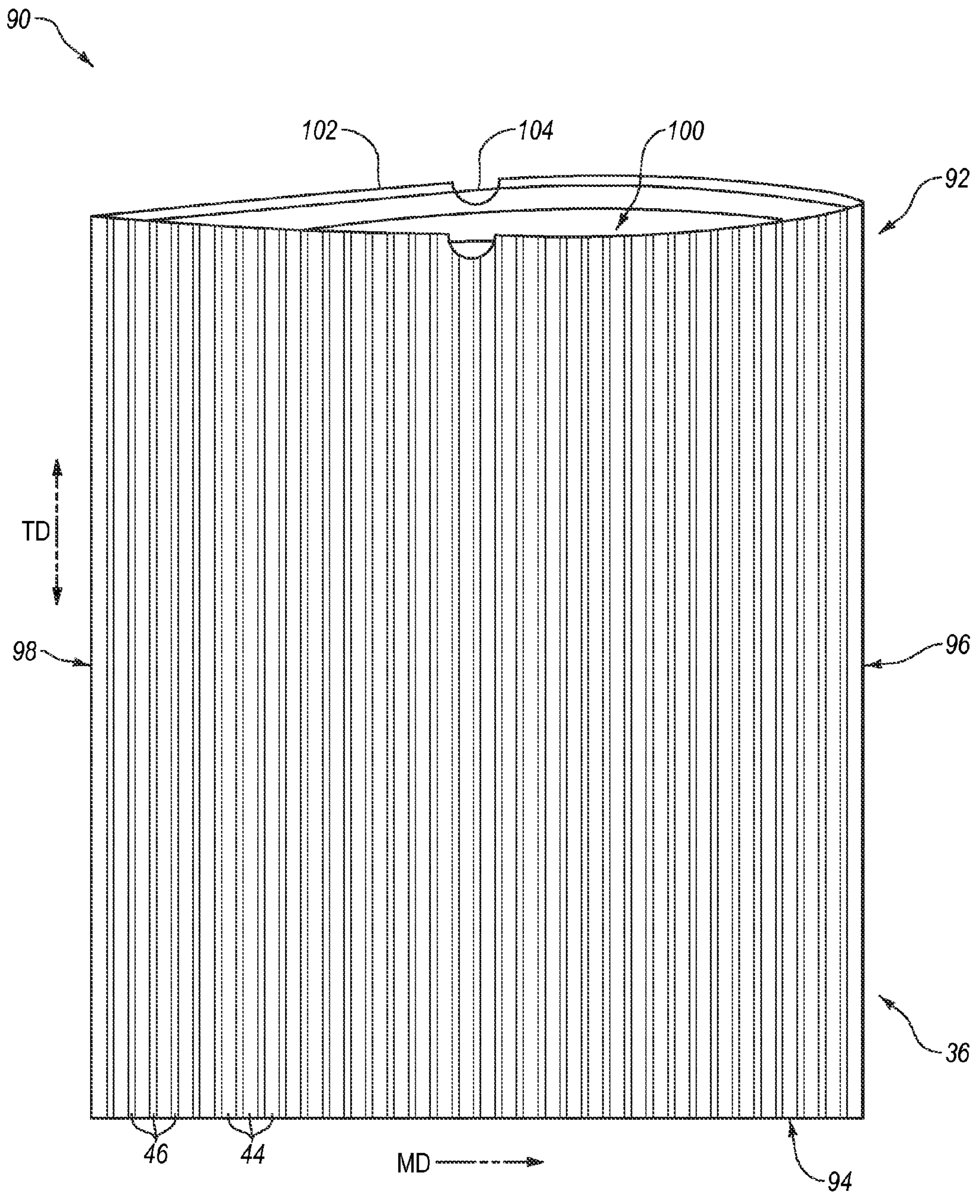
FIG. 7 illustrates a bag incorporating an MD incrementally-stretched film in accordance with one or more implementations of the present invention.

Referring to FIG. 7, in a particular implementation of the present invention, the MD incrementally-stretched film 10*b* illustrated in FIGS. 1A-1B may be incorporated in a bag construction, such as a flexible draw tape bag 90. The bag 90 can include a bag body 92 formed from a piece of MD incrementally-stretched film 10*b* folded upon itself along a bag bottom 94. Side seams 96 and 98 can bond the sides of the bag body 92 together to form a semi-enclosed container having an opening 100 along an upper edge 102. The bag 90 also optionally includes closure means 104 located adjacent to the upper edge 102 for sealing the top of the bag 90 to form a fully-enclosed container or vessel. The bag 90 is suitable for containing and protecting a wide variety of materials and/or objects. The closure means 104 can a draw tape as shown in FIG. 7. In alternative implementations, the closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include a ribbed pattern 36. The ribbed pattern 36 can include alternating series of thicker ribs and thinner ribs. The ribs can extend across the bag 90 in the TD direction, or in other words, from the bag bottom 94 to the upper edge 102. The bag 90 can require less material to form than an identical bag formed with an un-stretched film 10 of the same thermoplastic material. Additionally, despite requiring less material, the bag 90 can have the same or greater haze than an identical bag formed with an un-stretched film 10 of the same thermoplastic material. The maintained or increased tear haze can cause the bag 90 to appear thicker and stronger. Additionally, the maintained or increased tear haze can prevent or reduce the ability to see the contents within the bag 90.

Figure 8:
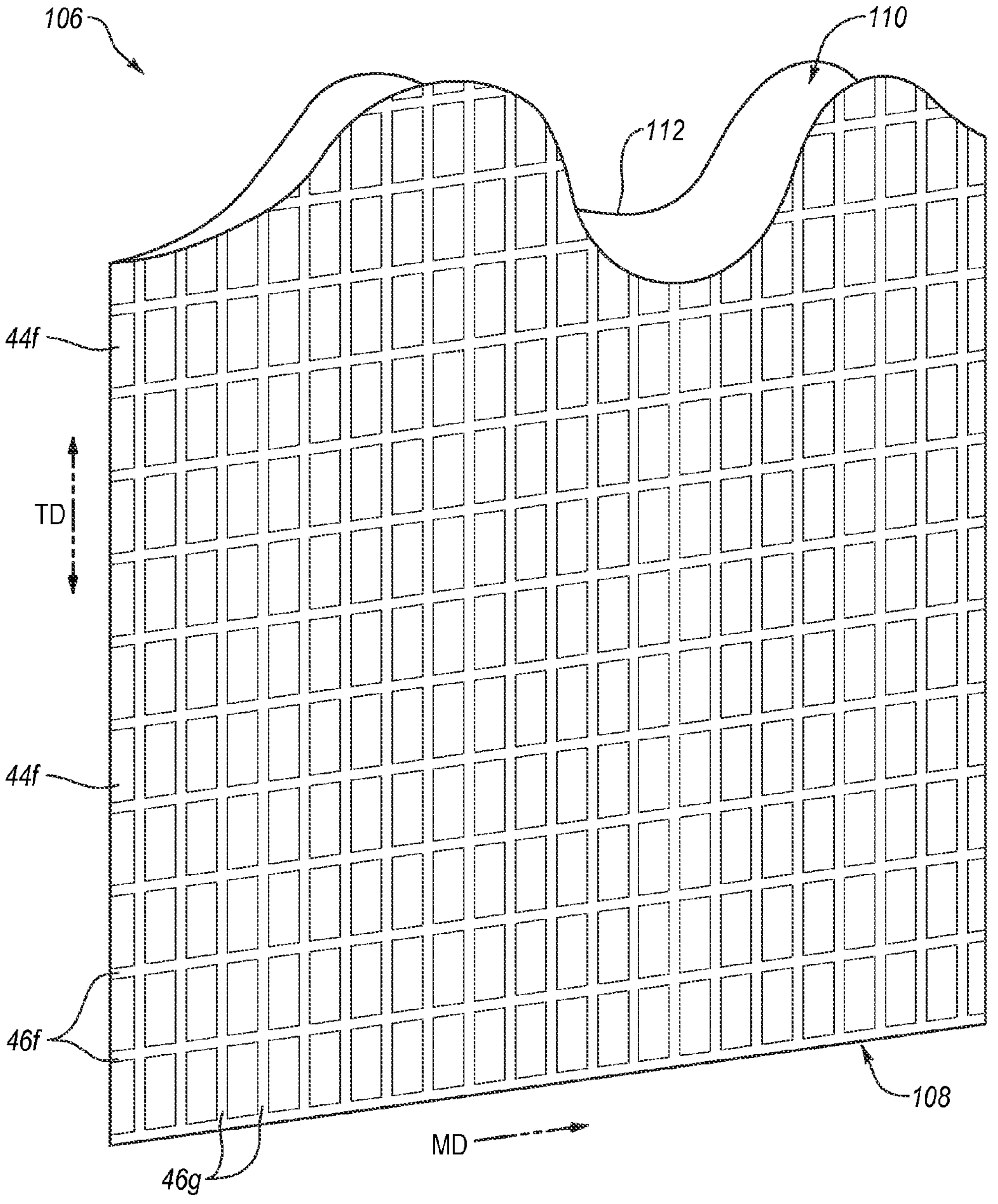
FIG. 8 illustrates a bag incorporating an MD and TD incrementally-stretched film in accordance with one or more implementations of the present invention.

FIG. 8 illustrates a tie bag 106 incorporating an MD- and TD-incrementally-stretched film in accordance with an implementation of the present invention. As shown, the sides of the tie bag 106 can include a ribbed pattern. The ribbed pattern can include thicker ribs or un-stretched regions 44*f* and thinner ribs 46*f*, 46*g* created by MD and TD ring rolling.

The ribbed pattern can include thinner ribs 46*f* that extend across the bag 106 in the machine direction. Additionally, the ribbed pattern can include thinner ribs 46*g* that extend across the bag 106 in the transverse direction, or in other words from the bag bottom 108 to flaps 110 of an upper edge 112 of the bag 106.

In comparison with the film 10*d* of FIG. 6, the spacing between the MD extending thinner ribs 46*f* is greater in the bag 106. This effect is created by using MD ring rolls having a greater pitch between ridges. Similarly, the spacing of the TD extending thinner ribs 46*g* is greater in the bag 106 than the film 10*d*. This effect is created by using TD ring rolls having a greater pitch between ridges. Furthermore, the relative spacing between the MD extending stripes and the TD extending ribs differs in the bag 106, while relative spacing is the same in the film 10*d*. This effect is created by using TD ring rolls having a greater pitch between ridges compared to the pitch between ridges of the MD ring rolls. One will appreciate in light of the disclosure herein that the use of intermeshing rollers with greater or varied ridge pitch can provide the different spacing and thicknesses of the ribs. Thus, one will appreciate in light of the disclosure herein that a manufacturer can vary the ridge pitch of the intermeshing rollers to vary the pattern of the ribs, and thus, the aesthetic and/or properties of the bag or film.

Figure 9:
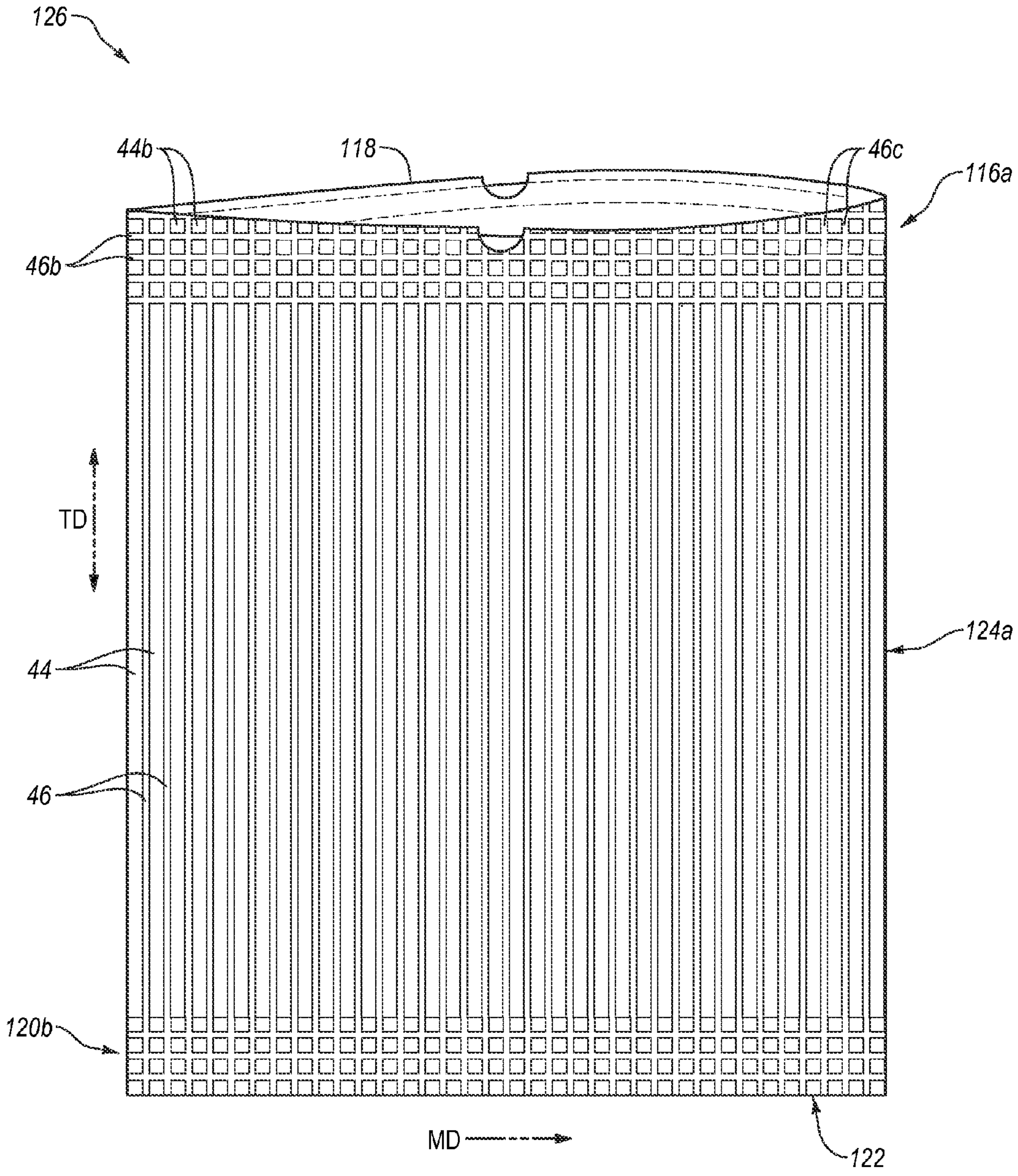
FIG. 9 illustrates a bag incorporating a film with regions that are MD and TD incrementally stretched, and regions that are only MD incrementally stretched in accordance with one or more implementations of the present invention.

FIG. 9 illustrates yet another bag 126 including having an upper section 116*a* adjacent a top edge 118 that includes alternating series of thicker ribs or un-stretched regions 44*b* and thinner ribs 46*b*, 46*c* created by MD and TD ring rolling similar to the film 10*d* of FIG. 6. Furthermore, the middle section 124*a* of the bag 126 can include thicker ribs 44 and thinner ribs 46 created by MD ring rolling. As shown, the middle section 124*a* is devoid of ribs extending in the machine direction.

Thus, one will appreciate in light of the disclosure herein that a manufacturer can tailor specific sections or zones of a bag or film with desirable properties by MD ring rolling, TD ring rolling, or a combination thereof. One region of the bag may include a first type of incremental stretching to increase the haze, while a second region includes a second type of incremental stretching designed to reduce gauge and maintain or increase the haze. Thus, a manufacturer can provide any region of a bag with the different incrementally-stretched films and their associated properties described herein above.

Figure 10:
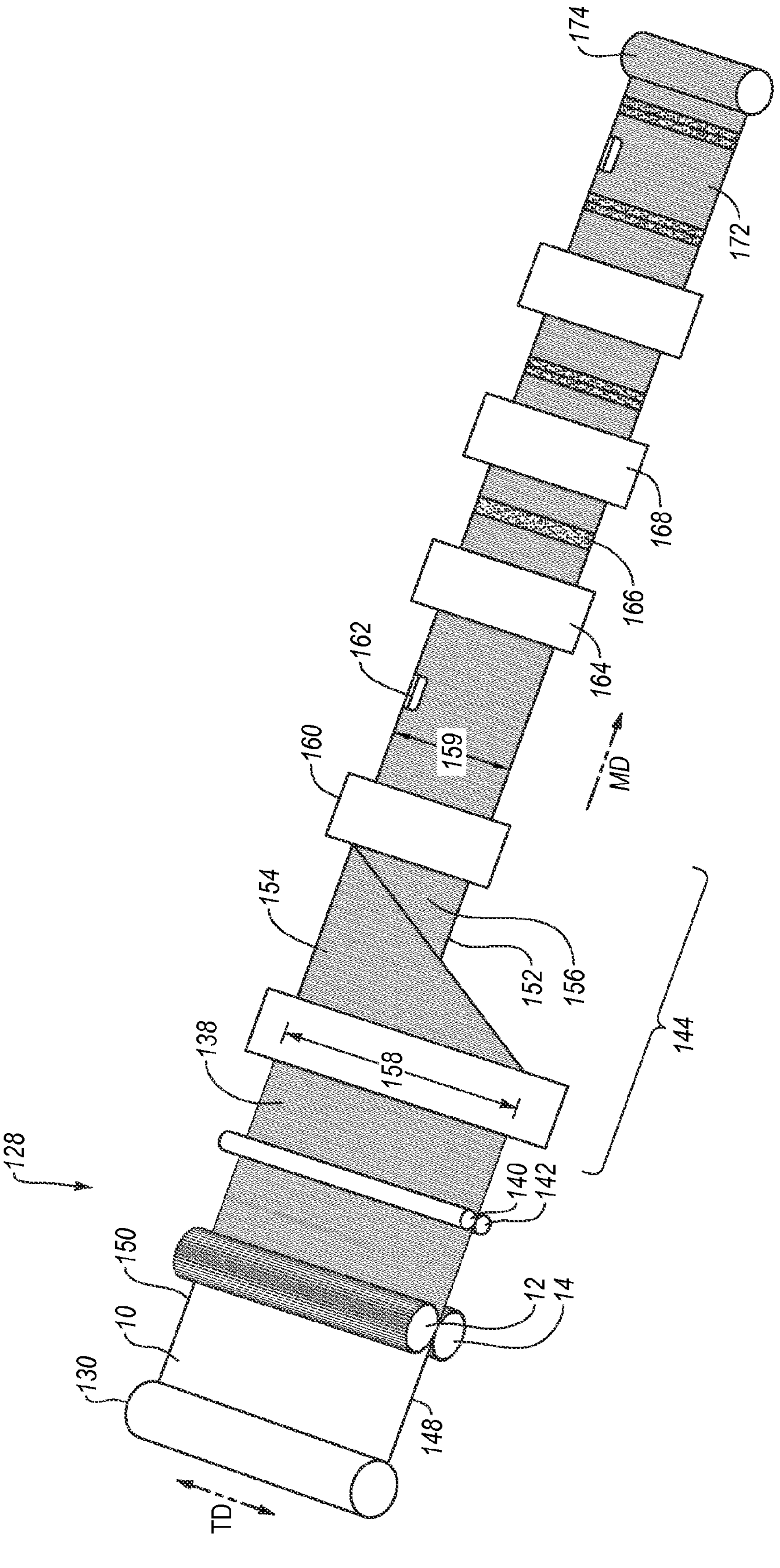
FIG. 10 illustrates a schematic diagram of a bag manufacturing process in accordance with one or more implementations of the present invention.

FIG. 10 illustrates an exemplary embodiment of a high-speed manufacturing process 128. The high-speed manufacturing process 128 can incrementally stretch a thermoplastic film in one or more of the machine direction and the transverse direction, while maintaining or increasing the haze. The process 128 can then produce a plastic bag there from with maintained or increased haze. According to the exemplary process, an un-stretched thermoplastic film 10 is unwound from a roll 130 and directed along a machine direction. The un-stretched film 10 can pass between one or more pairs of cylindrical intermeshing rollers to incrementally stretch the un-stretched film 10 and impart a ribbed pattern thereon. For example, FIG. 10 illustrates that the un-stretched film 10 can pass through a first pair of MD intermeshing rollers 12, 14. In alternative implementations, the un-stretched film 10 can pass through only TD intermeshing rollers 52, 54, or through TD intermeshing rollers 52, 54 and MD intermeshing rollers 12, 14.

The rollers 12, 14 may be arranged so that their longitudinal axes are perpendicular to the machine direction. Additionally, the rollers 12, 14 may rotate about their longitudinal axes in opposite rotational directions. In various embodiments, motors may be provided that power rotation of the rollers 12, 14 in a controlled manner. As the un-stretched film passes between the rollers 12, 14 the ridges of the intermeshing rollers can impart a ribbed pattern and incrementally stretch the film, thereby creating an incrementally-stretched film 138 (i.e., one of films 10*b*, 10*c*, 10*d*, or other MD and/or TD incrementally-stretched films).

During the manufacturing process 128, the incrementally-stretched film 138 can also pass through a pair of pinch rollers 140, 142. The pinch rollers 140, 142 can be appropriately arranged to grasp the incrementally-stretched film 138. The pinch rollers 140, 142 may facilitate and accommodate the incrementally-stretched film 138.

A folding operation 144 can fold the incrementally-stretched film 138 to produce the sidewalls of the finished bag. The folding operation 144 can fold the incrementally-stretched film 138 in half along the transverse direction. In particular, the folding operation 144 can move a first edge 148 adjacent to a second edge 150, thereby creating a folded edge 152. The folding operation 144 thereby provides a first film half 154 and an adjacent second web half 156. The overall width 159 of the second film half 156 can be half the second width 158 of the first film half 154 of the incrementally-stretched film 138.

To produce the finished bag, the processing equipment may further process the folded incrementally-stretched film 138. In particular, a draw tape operation 160 can insert a draw tape 162 into the incrementally-stretched film 138. Furthermore, a sealing operation 164 can form the parallel side edges of the finished bag by forming heat seals 166 between adjacent portions of the folded incrementally-stretched film 138. The heat seals 166 may be spaced apart along the folded incrementally-stretched film 138. The sealing operation 164 can form the heat seals 166 using a heating device, such as, a heated knife.

A perforating operation 168 may form a perforation in the heat seals 166 using a perforating device, such as, a perforating knife. The perforations in conjunction with the folded outer edge 152 can define individual bags 172 that may be separated from the incrementally-stretched film 138. A roll 174 can wind the incrementally-stretched film 138 embodying the finished bags 172 for packaging and distribution. For example, the roll 172 may be placed into a box or bag for sale to a customer.

In still further implementations, the folded incrementally-stretched film 138 may be cut into individual bags along the heat seals 166 by a cutting operation. In another implementation, the folded incrementally-stretched film 138 with may be folded one or more times prior to the cutting operation. In yet another implementation, the side sealing operation 164 may be combined with the cutting and/or perforation operations 168.

Figure 11:
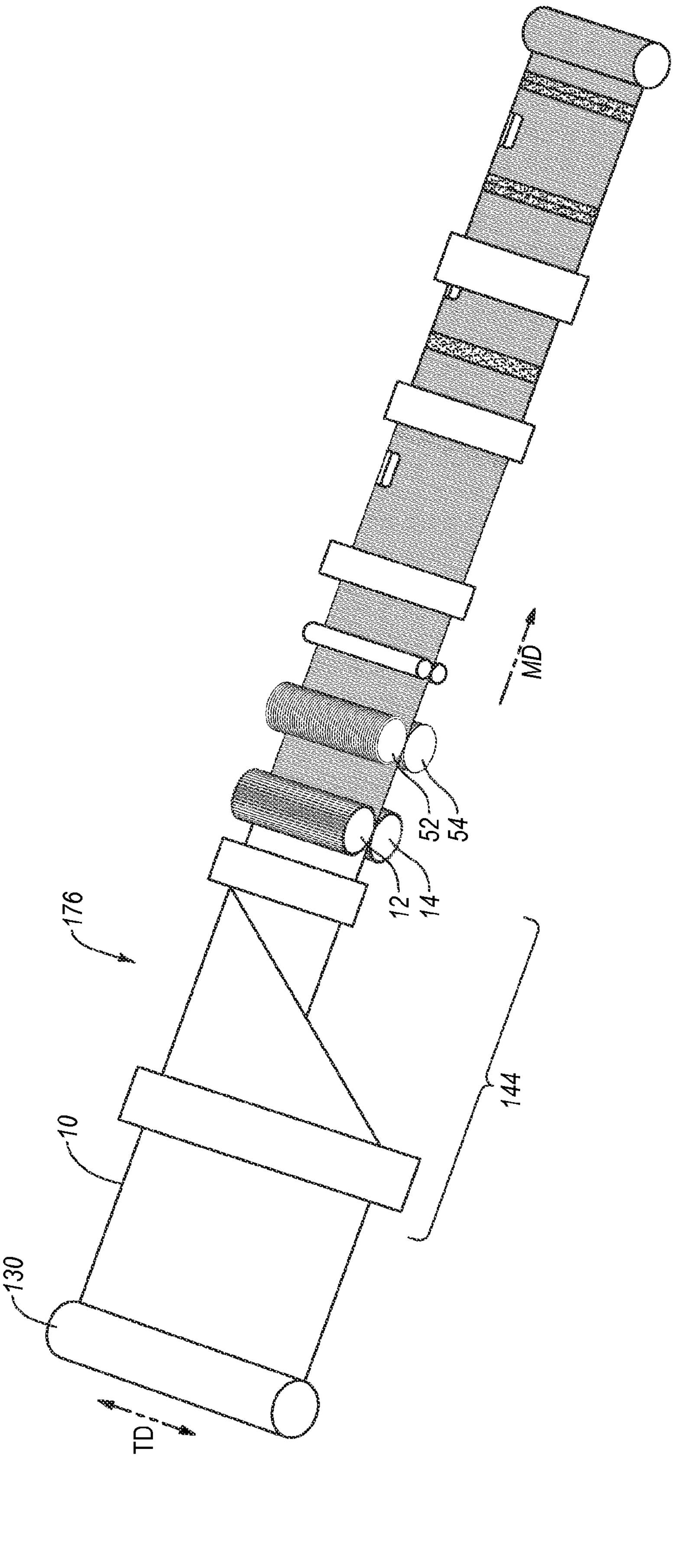
FIG. 11 illustrates a schematic diagram of another bag manufacturing process in accordance with one or more implementations of the present invention.

One will appreciate in light of the disclosure herein that the process 128 described in relation to FIG. 10 can be modified to omit or expanded acts, or vary the order of the various acts as desired. For example, FIG. 11 illustrates another manufacturing process 176 for producing a plastic bag having a ribbed pattern imparted therein. The process 176 can be similar to process 128 of FIG. 10, except that the un-stretched film 10 is incrementally after the folding operation 144 has folded the un-stretched film 10 in half. As shown by FIG. 11, both MD intermeshing rollers 12, 14 and TD intermeshing rollers 52, 54 can incrementally stretch the film 10 while maintaining or increasing the haze thereof.

Figure 12:
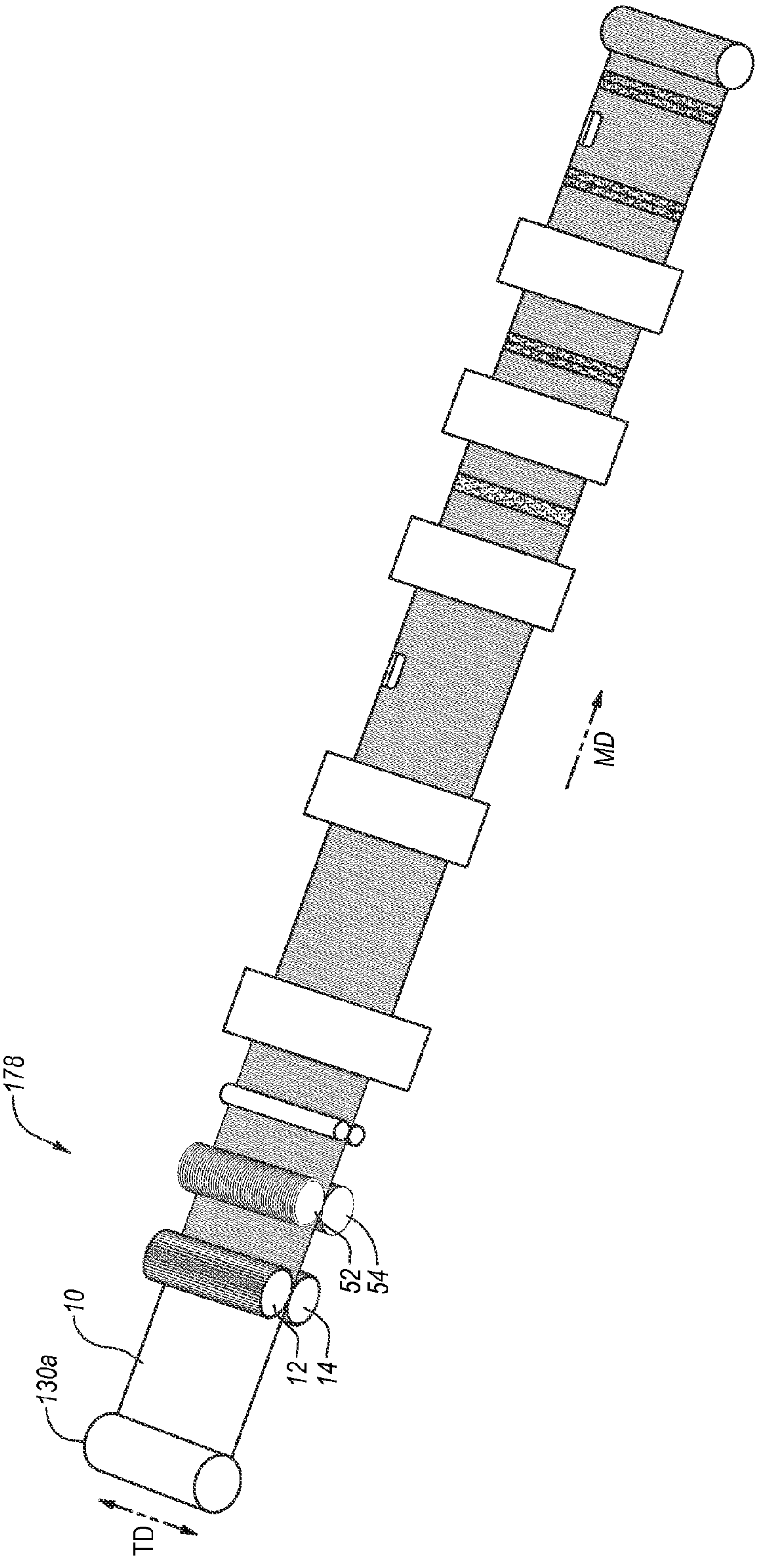
FIG. 12 illustrates a schematic diagram of yet another bag manufacturing process in accordance with one or more implementations of the present invention.

FIG. 12 illustrates yet another manufacturing process 178 for producing an incrementally-stretched plastic bag with maintained or increased haze. The process 178 can be similar to process 176 of FIG. 11, except that the un-stretched film 10 is folded prior to winding it on the roll 130*a*. Thus, in such implementations, the un-stretched film 10 unwound from the roll 130*a* is already folded.

Implementations of the present invention can also include methods of incrementally stretching a film of thermoplastic material in the machine direction without reducing the haze of the film. The following describes at least one implementation of a method with reference to the components and diagrams of FIGS. 1A through 12. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For example, one method in accordance with one or more implementations of the present invention can include providing a film of thermoplastic material 10. For example, the method can involve extruding a film 10 and directing the film 10 into a high speed manufacturing system. Optionally, the method can involve predominantly MD orienting the film. The film 10 of thermoplastic material can have a first haze and a first gauge by weight. In some implementations, the film 10 can have a substantially uniform starting gauge 42.

The method can also include forming a MD incrementally-stretched film by cold stretching the film 10 incrementally in the machine direction. In one or more implementations this can involve imparting a pattern 36 of alternating thick 44 and thin ribs 46 into the film 10. For example, the method can involve cold MD ring rolling the film 10. More specifically, the method can involve passing the film 10 through MD intermeshing rollers 12, 14. As the film 10 passes through the MD intermeshing rollers 12, 14, ridges 24, 26 extending in the transverse direction can impart the pattern 36 into the film and incrementally stretch the film 10 in the machine direction.

The method can also include selecting an MD DOE to pitch ratio of the intermeshing rollers 12, 14 to provide a desired haze and/or gauge by weight based on one or more material properties of the film 10. For example, the method can involve selecting an MD DOE to pitch ratio based on the orientation of the film 10.

Accordingly, FIGS. 1A-8 and the corresponding text, therefore, specifically show, describe, or otherwise provide a number of systems, components, apparatus, and methods for stretching a film in the machine direction. These apparatus and methods can stretch films as discussed that, at the very least, avoid, reducing the film's haze. There are several advantages associated with MD incrementally stretching a thermoplastic film in accordance with one or more implementations of the present invention. First, MD incrementally stretching a film can reduce the amount of thermoplastic material needed to produce a film of certain dimensions. Manufacturers can decrease the cost of their products if they use less thermoplastic material in their products. Depending on the amount that a film is stretched, this cost savings can be significant.

Second, the ribbed pattern 36 that is imparted onto an incrementally-stretched film 10*b* can make the film feel more durable to consumers. This can be important because consumers of products made in whole or in part from a thermoplastic film often associate the strength of a film with its feel. If a film feels thin or insubstantial, consumers may believe that the film is weak and fragile.

Third, if a thermoplastic film is incrementally stretched in the machine direction in accordance with one or more implementations of the present invention, the film's haze can be maintained or even increased. This finding is unexpected, as it is generally understood that MD stretching a thermoplastic film will decrease the film's haze. Indeed, in one or more implementations the haze of a thermoplastic film can be maintained or increased despite the reduction in gauge. In one or more implementations, the haze of the MD incrementally-stretched film 10*b* can be approximately equal to the haze of the un-stretched film 10.

In one or more implementations, the haze of the MD incrementally-stretched film 10*b* can be equal to or greater than the haze of the un-stretched film 10. More specifically, in one or more implementations, the haze of the MD incrementally-stretched film 10*b* can be approximately 1.0 to approximately 2.0 times greater than the haze of the un-stretched film 10. In further implementations, the haze of the MD incrementally-stretched film 10*b* can be approximately 1.0 to approximately 1.5 times greater than the haze of the un-stretched film 10.

Additionally, in one or more implementations, the gauge by weight of the MD incrementally-stretched film 10*b* can be equal to or less than the gauge by weight of the un-stretched film 10. More specifically, in one or more implementations, the gauge by weight of the MD incrementally-stretched film 10*b* can be between approximately 1.0 and approximately 0.4 times the gauge by weight of the un-stretched film 10. In further implementations, the gauge by weight of the MD incrementally-stretched film 10*b* can be less than approximately 0.98 times the gauge by weight of the un-stretched film 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. An incrementally-stretched film formed by stretching a thermoplastic film with a first haze, comprising:
- a thermoplastic material; and
- a ribbed pattern including thicker and thinner linear ribs extending across the incrementally-stretched thermoplastic film; and
- a haze that is greater than the first haze of the thermoplastic film;
- wherein the haze is between 32.1 and 52.2 percent.

2. The incrementally-stretched film as recited in claim 1, wherein the haze is between about 1.05 and about 1.5 times the first haze of the thermoplastic film.

3. The incrementally-stretched film as recited in claim 2, wherein the haze is between about 1.05 and 1.30 times the first haze of the thermoplastic film.

4. The incrementally-stretched film as recited in claim 2, further comprising a gauge by weight that is approximately equal to or less than a first gauge by weight of the thermoplastic film.

5. The incrementally-stretched film as recited in claim 4, wherein the gauge by weight is between approximately 0.97 and 0.50 times the first gauge by weight of the thermoplastic film.

6. The incrementally-stretched film as recited in claim 1, wherein the thicker and thinner linear ribs comprise a first set of thicker and thinner linear ribs extending across the incrementally-stretched thermoplastic film in a direction transverse to a direction in which the incrementally-stretched thermoplastic film was extruded.

7. The incrementally-stretched film as recited in claim 6, further comprising a second set of the thicker and thinner linear ribs extending across the incrementally-stretched thermoplastic film in the direction in which the incrementally-stretched thermoplastic film was extruded.

8. The incrementally-stretched film as recited in claim 1, wherein the thicker and thinner linear ribs comprise a first set of thicker and thinner linear ribs extending across the incrementally-stretched thermoplastic film in a direction in which the incrementally-stretched thermoplastic film was extruded.

9. The incrementally-stretched film as recited in claim 1, wherein:
- the haze of the incrementally-stretched film is between 112% and 130% of the first haze of the thermoplastic film; and
- the gauge by weight of the incrementally-stretched film is between about 0.70 and about 0.95 times the first gauge by weight of the thermoplastic film.

10. The incrementally-stretched film as recited in claim 1, wherein the thermoplastic material comprises one or more of polyethylene or polypropylene.

11. The incrementally-stretched film as recited in claim 10, wherein the thermoplastic material comprises linear low density polyethylene.

12. The incrementally-stretched as recited in claim 1, wherein the incrementally-stretched film is devoid of voiding agents.

13. The incrementally-stretched as recited in claim 1, further comprising a light transmission that is less than a first light transmission of the thermoplastic film.

14. The incrementally-stretched as recited in claim 1, wherein the thermoplastic film is pigmented.

15. A thermoplastic bag, comprising:
- a first sidewall including an incrementally-stretched film formed by stretching a thermoplastic film having a first haze;
- a second sidewall, the first and second sidewalls being joined together along a first side edge, an opposing second side edge, and along a bottom edge, wherein at least a portion of the respective top edges of the first and second sidewalls define an opening of the thermoplastic bag; and
- a first set of alternating thicker and thinner linear ribs in first and second sidewalls;
- wherein the first sidewall has a haze between 32.1 percent and 52.2 percent, and wherein the haze that is greater than the first haze of the thermoplastic film.

16. The thermoplastic bag as recited in claim 15, wherein the first set of alternating thicker and thinner linear ribs extend from the bottom edge toward the top edges of the thermoplastic bag.

17. The thermoplastic bag as recited in claim 16, further comprising a second set of alternating thicker and thinner linear ribs in one or more of the first or second sidewalls, the second set of alternating thicker and thinner linear ribs extending from the first side edge toward the second side edge.

18. The thermoplastic bag as recited in claim 15, wherein the first side wall comprises a gauge by weight that is between about 0.50 and about 0.95 times a first gauge by weight of the thermoplastic film.

19. The thermoplastic bag as recited in claim 15, wherein the haze is between about 1.05 and about 1.5 times the first haze of the thermoplastic film.

20. An incrementally-stretched film formed by stretching a thermoplastic film with a first haze, comprising:
- a thermoplastic material;
- a ribbed pattern including thicker ribs that alternate with thinner linear stretched regions, the ribbed pattern extending across the incrementally-stretched thermoplastic film; and
- a haze between 32.1 percent and 52.2 percent, wherein the haze is greater than the first haze of the thermoplastic film.

21. The incrementally-stretched film as recited in claim 20, wherein the haze is between about 1.05 and about 1.3 times the first haze of the thermoplastic film.

22. The incrementally-stretched film as recited in claim 21, further comprising a gauge by weight that is approximately equal to or less than a first gauge by weight of the thermoplastic film.

23. The incrementally-stretched film as recited in claim 22, wherein the gauge by weight is between approximately 0.97 and 0.50 times the first gauge by weight of the thermoplastic film.

24. The incrementally-stretched film as recited in claim 20, wherein the thicker ribs and the thinner linear stretched regions comprise a first set of thicker ribs and the thinner linear stretched regions extending across the incrementally-stretched thermoplastic film in a direction transverse to a direction in which the incrementally-stretched thermoplastic film was extruded.

25. The incrementally-stretched film as recited in claim 24, further comprising a second set of the thicker ribs and thinner linear stretched regions extending across the incrementally-stretched thermoplastic film in the direction in which the incrementally-stretched thermoplastic film was extruded.

26. The incrementally-stretched film as recited in claim 20, wherein the thermoplastic film comprises a hexene gas phase LLDPE that is devoid of pigments and voiding agents.

* * * * *